United States Patent
Kirkpatrick

(10) Patent No.: US 11,022,769 B2
(45) Date of Patent: Jun. 1, 2021

(54) PRE-TERMINATED OPTICAL FIBRE CABLE ASSEMBLY, METHODS OF MANUFACTURE AND INSTALLATION THEREOF

(71) Applicant: EMTELLE UK LIMITED, Hawick (GB)

(72) Inventor: Eben Colin Kirkpatrick, Hawick (GB)

(73) Assignee: EMTELLE UK LIMITED, Hawick (GB)

( * ) Notice: Subject to any disclaimer, the term of this patent is extended or adjusted under 35 U.S.C. 154(b) by 0 days.

(21) Appl. No.: 16/483,321

(22) PCT Filed: Feb. 7, 2018

(86) PCT No.: PCT/GB2018/050344
§ 371 (c)(1),
(2) Date: Aug. 2, 2019

(87) PCT Pub. No.: WO2018/146470
PCT Pub. Date: Aug. 16, 2018

(65) Prior Publication Data
US 2020/0012062 A1    Jan. 9, 2020

(30) Foreign Application Priority Data
Feb. 7, 2017    (GB) ..................... 1701997

(51) Int. Cl.
*H01R 31/00*    (2006.01)
*G02B 6/44*    (2006.01)
*G02B 6/50*    (2006.01)

(52) U.S. Cl.
CPC ......... *G02B 6/4432* (2013.01); *G02B 6/4438* (2013.01); *G02B 6/4471* (2013.01); *G02B 6/4486* (2013.01); *G02B 6/50* (2013.01)

(58) Field of Classification Search
CPC .. G02B 6/3887; G02B 6/4432; G02B 6/4438; G02B 6/4464; G02B 6/4465; G02B 6/4471; G02B 6/4486; G02B 6/50
See application file for complete search history.

(56) References Cited

U.S. PATENT DOCUMENTS 5,151,962 A    9/1992    Walker et al.
5,863,083 A    1/1999    Giebel et al.
(Continued)

FOREIGN PATENT DOCUMENTS

EP    0490609 A2    6/1992
EP    2485077 A1    8/2012
(Continued)

*Primary Examiner* — Paul D Kim
(74) *Attorney, Agent, or Firm* — Perkins IP Law Group LLC; Jefferson Perkins

(57) ABSTRACT

The present invention relates to a pre-terminated (pre-terminated) optical fibre cable assembly (10,90), which is configured to be installed through a duct (20). The pre-terminated optical fibre construction (10,90) includes at least one optical fibre (46). A protective sleeve (26) is added to the optical fibre (46) before adding a terminal connector (24) to the leading end of at least one optical fibre (46). The protective sleeve (26) extends from behind the terminal connector (24) along part of the length of the optical fibre (46). When the cable is installed through a duct, the protective sleeve protects the portion of the fibre that protrudes from the end of the duct, for example in a communications cabinet (16). A residual length (28) of the protective sleeve remains within the duct. Terminal connectors and protective sleeves can be applied at both ends of the cable assembly, or only one end.

44 Claims, 7 Drawing Sheets

(56) References Cited

U.S. PATENT DOCUMENTS

| | | | |
|---|---|---|---|
| 7,778,511 B1 | 8/2010 | Bradley et al. | |
| 8,814,446 B2* | 8/2014 | Labraymi | G02B 6/4475 |
| | | | 385/100 |
| 9,297,976 B2* | 3/2016 | Hill | G02B 6/3826 |
| 9,753,234 B2* | 9/2017 | Stockton | G02B 6/3821 |
| 2006/0280413 A1 | 12/2006 | Paschal et al. | |
| 2011/0305424 A1 | 12/2011 | Pierce et al. | |
| 2013/0216191 A1 | 8/2013 | Yamauchi et al. | |
| 2018/0120530 A1* | 5/2018 | Compton | G02B 6/443 |
| 2018/0217335 A1* | 8/2018 | Leeson | G02B 6/381 |

FOREIGN PATENT DOCUMENTS

| | | |
|---|---|---|
| GB | 2509532 A | 7/2014 |
| JP | 2013120339 A | 6/2013 |
| WO | 2014015902 A1 | 1/2014 |

\* cited by examiner

PRE-TERMINATED OPTICAL FIBRE CABLE ASSEMBLY, METHODS OF MANUFACTURE AND INSTALLATION THEREOF

FIELD OF THE INVENTION

The present invention relates to improved pre-terminated (also called "pre-connectorised") optical fibre cables. The invention further relates to methods of manufacture and installation of pre-terminated optical fibre cables.

BACKGROUND TO THE INVENTION

Optical fibre transmission lines can be installed through a duct, for example a so-called micro-duct, using compressed gas or fluid, for example air. This is known as installation by blowing, and special lightweight cable assemblies known as "fibre units" have been developed for this installation method. Optical fibre transmission lines can also be installed by pushing, or pulling, or preinstalled in a duct. Different cable designs can be used for these different methods. For example, a cable adapted for installation by pulling may include strengthening fibres, surrounding the optical fibres with in an outer sheath.

Fibre to the home (FTTH) is the generic term for broadband network architecture that uses optical fibre technology to carry data to a residential dwelling from a broadband service provider via a telecommunications cabinet located near the residential dwelling. Embodiments of the present invention may be applied in FTTH applications, or in installation of optical fibre transmission lines to a variety of premises and within premises.

Using the blowing process to install optical fibre transmission lines into an optical fibre duct typically uses viscous drag generated by a high-speed flow of a fluid, for example air. This process is described in many patent publications, for example EP108590 and EP2074456. EP108590 describes pressurised air being pumped into a chamber in a blowing head. The air is directed through a tube at the blowing head and into a duct. The optical fibre transmission line is fed into the tube by a pushing force, between a pair of motorised drive rollers. When a sufficient length of transmission line has been pushed into the duct, the pressurised air works on the fibre surface allowing the effects of viscous drag to take over, at least partly, the task of advancing the transmission line along the duct until the transmission line exits the far end of the duct at the desired location.

Several different constructions of fibre units have been designed specifically for installation by blowing. To be successful, such units require to be lightweight, but have a certain stiffness. There is also a significant requirement for fibre units to be compact, for example being less than 2 mm, preferably less than 1.5 mm in diameter. One type of fibre unit adapted to be installed by the blowing process comprises a number of optical fibres embedded in a cured resin, for example acrylate resin, which locks the fibres in a unitary matrix. This coated fibre bundle is then covered by an outer sheath, for example a sheath or sleeve of low friction, thermoplastic material. The sheath material may for example comprise HDPE with a friction-reducing additive. Examples of this type of fibre unit are disclosed for example in WO2004/015475.

Another type of fibre unit adapted to be installed by blowing comprises optical fibres or optical fibre bundles embedded in a softer resin, surrounded by a harder resin layer. The outermost part of the hard resin layer is modified by the addition of glass micro beads, which provide lower friction against the duct wall, and also increase air resistance, to promote installation by fluid drag. This type of fibre unit is disclosed in U.S. Pat. No. 5,557,703, for example.

As mentioned above, pulling is another example of installing an optical fire transmission line into and through a duct. This process involves applying a pulling load to the leading end of the transmission line. The transmission line can be pulled by applying the load directly to the leading end of the transmission line or via a carriage device, which carries the leading end of the transmission line. The pulling load may be applied via the exit end of the duct using a pulling line previously installed in the duct. A pulling force can also be applied using air resistance, for example by fitting an "umbrella" or "parachute" accessory to the leading end of the transmission line, and pumping air into the trailing end of the duct. (This is not the same as installation by blowing, because the cable has to be able to withstand pulling forces from the front end, rather than being propelled by a drag force applied along its full length.)

In order to reduce the risk of faulty installations, and to speed up the installation this requirement for specialist skills and equipment, there is a trend to use pre-terminated or "pre-connectorised" cable assemblies. At one or both ends of a pre-terminated optical fibre transmission line, one or two ferrule connectors are generally attached to one or two optical fibres respectively, prior to installing the optical fibre transmission lines between the consumer site, for example a residential dwelling and a supply site, for example a telecommunication cabinet.

Following installation by, a connector body, for example an LC or SC type connector, can be fitted to the ferrule to complete the functional connector. Example connectors are described in EP1972974, EP2012152, EP2012153, EP1783523, EP1783524, EP1783522.

This process of installation leaves an exposed length of the transmission line within the cabinet, between the end of the duct and the mating connector. The exposed length needs to be protected against damage. A known method of protection is to apply a woven or braided tube or sheath that can be fitted over the length of the transmission line that exits the duct, prior to fitting the connector or connectors to the ferrule. The woven or braided tube or sheath is generally manufactured to a set length, for example 1.5 m, and includes collars on both ends. Alternatively, the woven tube or sheath is provided without fitted collars, but is trimmed and fixed at the ends to the transmission line and duct once fitted. A collar/connector is fitted to the exit end of the duct to prevent movement of the optical fibre or fibres after installation and/or to provide a seal between the outer sheath and the duct to prevent gas or fluid ingress or egress.

It will be appreciated that fitting a manufactured length of the woven or braided tube pre-fitted with collars/connectors can be problematic. If the portion of transmission line protruding from the duct is longer than the manufactured length of the woven or braided tube, the collar/connector at the duct end of the woven or braided tube or sheath will not reach the exit end of the duct. The transmission line cannot be pulled back, if it has been installed by blowing, and it cannot be trimmed without losing the benefits of pre-termination A woven or braided sheath or tube, that has no collars/connectors offers versatility in ensuring the correct length of sheath is provided. However, trimming the sheath and securing the sheath to the ferrule end and duct end of the sheath can be time consuming and risks local damage to the transmission line during the process of trimming and connecting the woven sheath to the ferrule end of the transmission line and the duct exit.

In short, there is a need to find alternative techniques for protecting the protruding ends of lightweight fibre units, of the type blown through micro-ducts to communications cabinets, or consumer premises.

Cable assemblies exist which are more robustly protected from end to end could be used. However, these are not suited for installation by blowing, and may be bulkier than the lightweight units used for blowing. Even in applications where they can be used, they also present challenges when one tries to implement pre-terminated cables. Published international patent application WO2014/015902A1 describes methods of installing "drop cables" between a riser cable and individual apartments or offices. The drop cables are pre-terminated at both ends. The forms of these cables are such that a fibre is loosely contained in an inner sheath, which is surrounded by strength members such as aramid fibres. These are then surrounded by an outer sheath, providing a flexible cable assembly strong enough to be installed by pulling over the distance of the drop. As described in the patent application, a problem arises due to the bulk of this construction, which may be 4 or 5 mm in diameter. When using a drop cable that has been pre-terminated at both ends, there will generally be substantial excess cable length, once the cable has been installed between the two endpoints. This excess cable length is to be stored somewhere. According to the disclosure of the international patent application, the outer sheath and strength members are removed from this excess section after installation to the correct length, using ripcords embedded within the sheath material. The excess length section, stripped of the outer sheath, can then be coiled and stored in a smaller space.

SUMMARY OF THE INVENTION

A first aspect of the present invention provides a pre-terminated optical fibre cable assembly configured to be installed through a duct, the pre-terminated optical fibre construction comprises:

at least one optical fibre a terminal connector on at least a leading end of at least one optical fibre; and a protective sleeve extending from behind the terminal connector along part of the length of the optical fibre.

The pre-terminated construction may further comprise a protective layer over the at least one optical fibre. The protective layer may extend over a major part of the length of the optical fibre and the protective sleeve may extend along a minor part of the length of the optical fibre.

The protective layer may extend over substantially the full length of the optical fibre.

The protective layer may include or comprise a first layer in which the at least one optical fibre is embedded (optionally with one or more other optical fibres). The first layer may comprise a UV-cured resins, such as an acrylate material. The first layer may be surrounded by an outer sheath of extruded material over at least the majority of the length of the optical fibre. The outer sheath may comprise for example a thermoplastic polymer, for example high density polyethylene (HDPE) material or the like.

In other embodiments, the first layer may be surrounded by one or more further layers of UV-cured resin, optionally with surface modification by the addition of particles such as glass beads.

In embodiments where a first layer is surrounded by an outer sheath, the outer sheath may extend beneath said protective sleeve along substantially the whole length of the protective sleeve. Alternatively, the outer sheath may extend beneath said protective sleeve along only a part of its length, for example only a few millimetres or centimetres.

In other embodiments where a first layer is surrounded by an outer sheath, the outer sheath has been removed from the portion of the optical fibre that lies beneath the protective sleeve, and extends from a point behind the protective sleeve and over a major part of the length of the optical fibre.

In such embodiments, the protective sleeve and the outer sheath may be dimensioned such that a forward end of the outer sheath substantially abuts a rearward end of the protective sleeve so as to limit rearward sliding of the protective sleeve along the optical fibre. Similarly, the protective sleeve and the terminal connector may be dimensioned so that the terminal connector limits forward sliding of the protective sleeve along the optical fibre.

References to "behind", "forward" and similar terms refer naturally to the direction of installation. In embodiments that are pre-terminated and provided with a protective sleeve at both ends of the optical fibre, the terms "behind", "forward" and similar terms are defined relative to each end independently.

The protective sleeve may comprise a composite body with low-friction properties, wherein at least an outer surface of the protective sleeve is provided with low friction properties. The surface properties of the protective sleeve maybe such that kinetic friction is lower than static friction.

The protective sleeve may comprise a polymer material formed such that an outer surface of the protective sleeve has a coefficient of friction in the range of 0.05 to 0.3. The coefficient of friction may be measurable in a conventional manner, for example in the manner described in WO2004015475.

The outer surface of the protective sleeve may comprise a low-friction coating provided by a mixture of a polymer and a friction reducing material. The protective sleeve may comprise primarily High density polyethylene (HDPE), and/or one or more of HDPE, Medium density polyethylene (MDPE), Nylon, Polypropylene etc. The friction reducing material may comprise a silicon-based material including a polyether modified poly (dimethylsiloxane) material such as a polyether modified hydroxy functional poly-(dimethylsiloxane) material. Alternatively, or in addition erucamide and/or oleamide materials may be used for improving slip and reducing friction.

The protective sleeve may also provide insulation properties, wherein the material forming the protective sleeve is designated flame retardant and low smoke zero halogen. For example, the material forming the protective sleeve may comprise a polyethylene based polymer having zero halogen and/or flame resistant properties.

The protective sleeve may comprise a hollow body like a tube, within which hollow body at least the optical fibre is received. The protective sleeve may comprise a hollow body, within which at least the optical fibre and part of the protective layer are received.

The body of the protective sleeve may comprise one or more layers of material.

The protective sleeve may comprise an outer layer comprising at least a low-friction outer surface, a middle layer comprising strengthening material, and an inner layer comprising a resilient material, wherein the middle layer is sandwiched between the inner layer and the outer layer.

The outer layer of the protective sleeve may comprise HDPE or another polyethylene based material comprising a friction reducing agent such that the outer layer exhibits low-friction properties. The outer layer may comprise a mixture of Polyethylene, for example of the brand Borstar®, and a friction reducing agent.

The middle layer, may comprise a strengthening material. For example the middle layer may comprise fibres such as aramid fibres commonly known as Kevlar®. The middle layer may not be required for some applications.

The inner layer may comprise a material that is resilient, heat resistant and chemical resistant. For example, the inner layer may comprise a thermoplastic elastomer that combines the flexibility of rubber with the strength and processability of thermoplastics. An example of this thermoplastic elastomer is a copolyester, for example of the brand Hytrel®, available from DuPont.

Passage of the pre-terminated optical fibre construction through the duct is improved by providing a protective sleeve having low friction properties, at least on the outside surface, such that less jamming, less stopping and less restarting during the installation process is expected.

In one embodiment, a duct for an optical fibre construction comprising a single LC or SC connector may have an internal bore diameter of approximately 3.5 mm. Therefore, the outer diameter of the protective sleeve may be less than 3.5 mm, for example less than 2.5 mm or less than 2.3 mm. The protective sleeve may have an outer diameter between 0.5 mm and 3.5 mm.

In an alternative embodiment, a duct, for an optical fibre construction comprising a duplex LC or SC connector, may have an internal bore diameter of approximately 8 mm Therefore, the outer diameter of the protective sleeve may be less than 8 mm. For example, the protective sleeve may have an outer diameter of less than 5 mm.

The protective sleeve may be fixed against longitudinal movement relative to the optical fibre, by fixing at least a first end of the protective sleeve to the underlying layer. In other embodiments, the sleeve is free moving over a section of the underlying optical fibre before it is installed, for example within a range of around 10-20 mm, so it is no longer fixed. As mentioned above, and such embodiments, an outer sheath of the cable assembly may about the protective sleeve, so as to stop stops the sleeve travelling along the fibre bundle. The sheath can be fixed at the connector end, after installation.

The protective sleeve may be fixed against movement relative to the optical fibre, by fixing both ends or no ends or along its full length depending on design.

The protective sleeve may extend axially from behind the connector along the optical fibre.

The protective sleeve may extend along a minor part of the length of the optical fibre. For example, the protective sleeve may extend along the optical fibre for less than 50% or 40% or 30% or 20% or 10% of the length of the optical fibre.

The maximum length of the protective sleeve may be influenced by the installation technique, for example blowing or pulling, wherein blowability would favour shorter lengths. In addition, the maximum length of the protective sleeve may be influenced by cost implications, again where shorter lengths would be more cost effective.

To ensure protection in a particular environment, such as a telecommunication cabinet, the desired length of the protective sleeve is such that a portion of the protective sleeve remains within the duct after the leading end/connector end of the optical fibre emerges from the duct.

The length of optical fibre that emerges from a duct is generally in the region of 1.5 m. Therefore, the protective sleeve may be longer than 1.5 m long. For example, the protective sleeve may be longer than 2 m long. The protective sleeve may be shorter than 1.5 m long, where the length of optical fibre construction emerging from the duct is shorter than 1.5 m. For example, the protective sleeve may be greater than 0.5 m long, or greater than 1.0 m.

The protective sleeve may be up to 10 m long.

At least a section of the protective sleeve may be fixed against movement relative to at least one optical fibre, wherein the section is proximate the leading end of the protective sleeve. The section may be fixed using an adhesive or a bonding material inside the protective sleeve or by using the outer sleeve of the fibre bundle as a restraint A further aspect of the present invention provides a method of assembling a pre-terminated optical fibre cable assembly configured to be installed through a duct, the method comprises the steps of:

taking at least one optical fibre;

fitting a protective sleeve from a leading end of the optical fibre and extending the protective sleeve along at least part of the length of the optical fibre;

attaching a terminal connector to the leading end of at least one optical fibre; and arranging the protective sleeve to extend from behind the connector along part of the length of the optical fibre towards a trailing end of the optical fibre.

The method may further comprise:

fixing at least a section of the protective sleeve relative to the at least one optical fibre.

The method of assembling the pre-terminated optical fibre construction configured to be installed through a duct, may further comprise the steps:

applying a second protective sleeve along part of the length of the optical fibre extending from the trailing end of the optical fibre towards the leading end of the optical fibre cable; and attaching at least one connector to at least one optical fibre on the trailing end of the optical fibre.

The method may further comprise:

fixing at least one end of the second protective sleeve relative to the optical fibre.

The optical fibre may comprise a protective layer, which may include a first layer in which the at least one optical fibre is embedded. The first layer maybe surrounded by an outer sheath or further protective layer. The step of applying the first protective sleeve may comprise overlapping at least part of the protective layer. Optionally, the step of applying the first protective sleeve may include removing outer sheath or further protective layer, from at least part of the optical fibre, before applying the first protective sleeve over that part of the optical fibre.

A further aspect of the present invention provides a method of installing a pre-terminated optical fibre cable assembly, the method comprising the steps:

inserting a pre-terminated optical fibre cable assembly into a duct via a leading end of the pre-terminated optical fibre construction; and transporting a length of the pre-terminated optical fibre construction through the duct until a predetermined length of the pre-terminated optical fibre construction emerges from the duct and wherein a section of the protective sleeve remains within the duct; and adding a connector body to a terminal connector on the end of the pre-terminated optical fibre construction emerging from the duct.

The method of installing a pre-terminated cable assembly may further comprise: sealing the duct exit. Sealing the duct exit may be by fitting a seal over the emerging section of the protective sleeve and fitting the seal to the duct exit. The seal may include a plug and a cap element, wherein the plug extends into the duct and the cap is operable to close the end of the duct.

The method of installing a pre-terminated construction, may further comprise clamping the protective sleeve proximate the duct exit, wherein clamping the protective sleeve is effective to prevent movement of the optical fibre relative to the duct.

The step of sealing the duct exit may also facilitate clamping the protective sleeve. Inserting the plug section into the duct may compress the protective sleeve thereby clamping the underlying optical fibre to prevent movement of the optical fibre relative to the duct.

Sealing the duct and clamping the protective sleeve may be facilitated by one or more components received over the protective sleeve at the duct exit.

The step of applying the connector body may include clamping or otherwise fixing the protective sleeve against longitudinal movement relative to the connector body.

The method of installing a pre-terminated construction, may further comprise connecting one end of the pre-terminated construction to supply equipment and one end of the pre-terminated construction to consumer equipment.

BRIEF DESCRIPTION OF THE DRAWINGS

Embodiments of the present invention are described below, by way of example only, with reference to the accompanying drawings, in which.

DESCRIPTION

Figure 1:
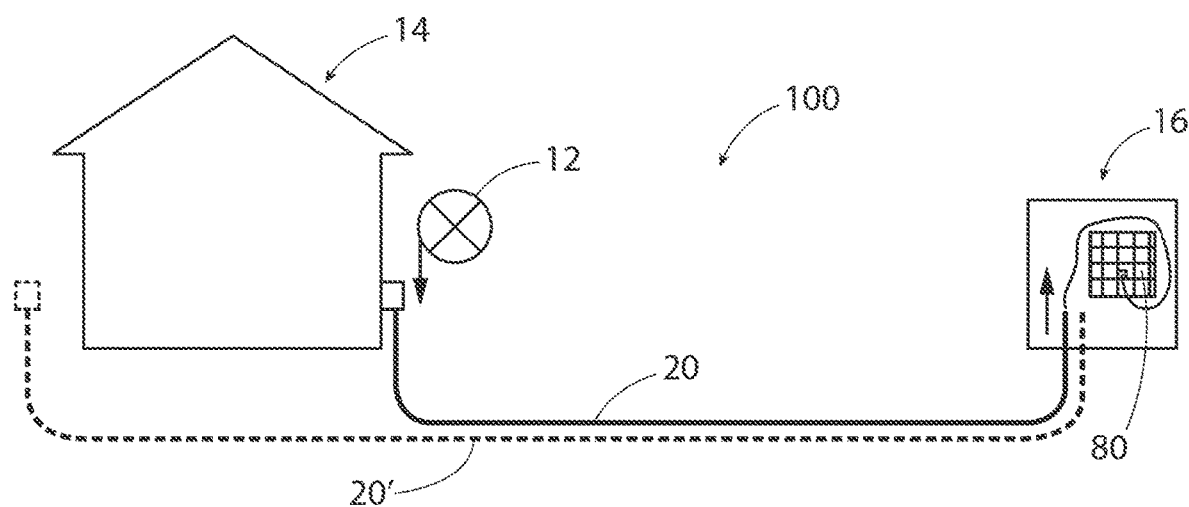
FIG. 1 is a schematic representation of a method of installing Fibre to the Home (FTTH), which includes installing a pre-terminated optical fibre construction according to an embodiment of the present invention.
Figure 2:
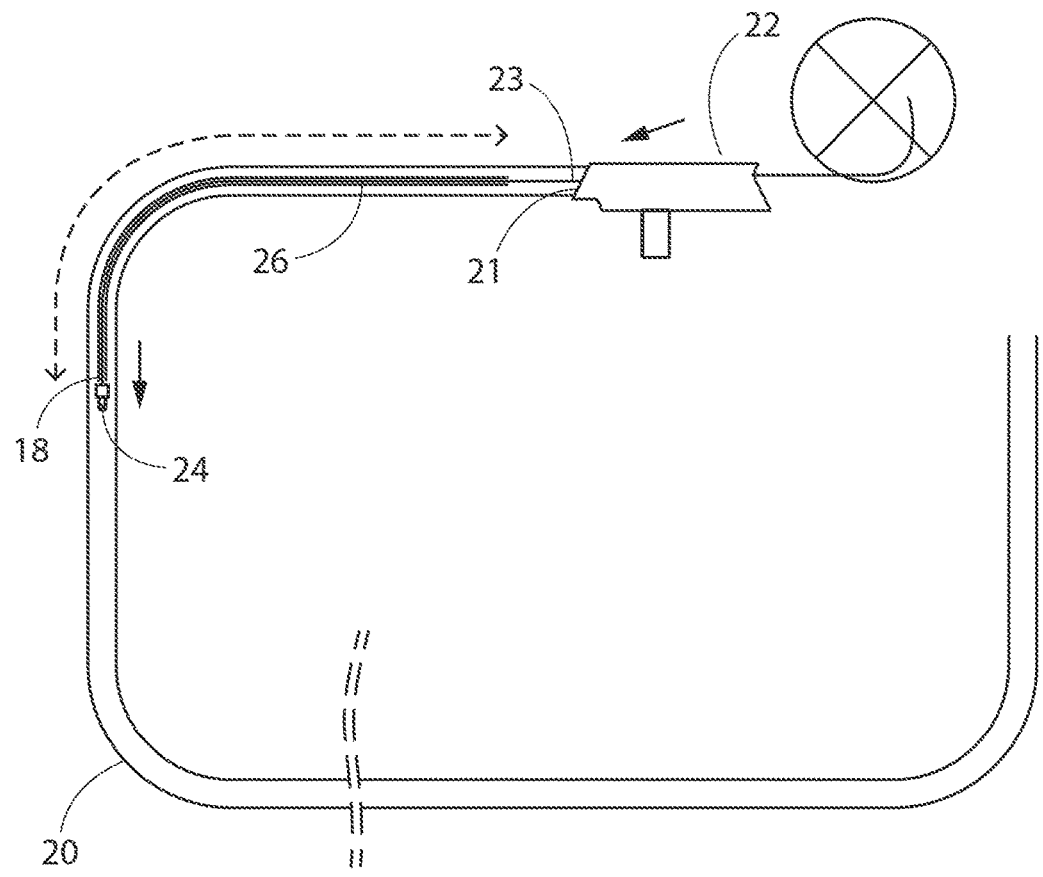
FIG. 2 is a schematic representation of a blowing process, as an example of how to install a pre-terminated optical fibre construction according to an embodiment of the present invention between a home location and a transmission/supply location.

FIGS. 1 and 2 show an example of a Fibre to the Home (FTTH) installation 100 of optical fibres, using a pre-terminated optical fibre cable assembly 10 according to an embodiment of the present invention. It will be understood that terms such as "consumer" and "home" are used by way of example only, and the products and techniques described herein may equally be applied in commercial and industrial installations.

In the illustrated example, the pre-terminated cable assembly 10 is provided wound on a reel 12 from which pre-terminated optical fibre or fibres are delivered from the consumer side/home side 14 of the installation 100 to the supply side, for example a telecommunications cabinet 16. Instead of a reel 12, the pre-terminated cable assembly 10 may be provided in other forms, for example in a coil, in a fibre pan etc.

Referring also to FIG. 2, in the illustrated example, the FTTH installation 100 is performed by passing it into a pre-installed duct 20. Other ducts 20' etc, lead from the same cabinet 16 to other premises, so that this installation method may be repeated many times in a neighbourhood.

FIG. 2 shows, by way of example, installation by blowing, from the consumer side of the installation to the supply side. A leading end 18 of the pre-terminated optical fibre cable assembly 10 is transported through a duct 20 at least partly by viscous drag created by compressed fluid, for example compressed air. A special blowing machine 22 has a blowing head 21 which is coupled to the leading end 23 of the duct 20. It will be appreciated that the installation process may also be conducted from the supply side, for example a telecommunication cabinet 16, to the consumer side, according to convenience.

Depending on the situation, including for example the length of connection required, blowing may be the most suitable method of installation. However, the present disclosure is not limited to blowing. An alternative installation process (illustrated later in FIG. 8) involves physically pulling the leading end 18 of the pre-terminated optical fibre cable assembly 10 through the duct 20 via the trailing end or the duct exit 20'. For shorter installations, simply pushing the assembly through the duct may be practicable.

The leading end 18 of the pre-terminated optical fibre cable assembly 10, which includes a ferrule connector 24, leads the installation of the optical fibre or fibres 46 through the duct 20.

Figure 8:
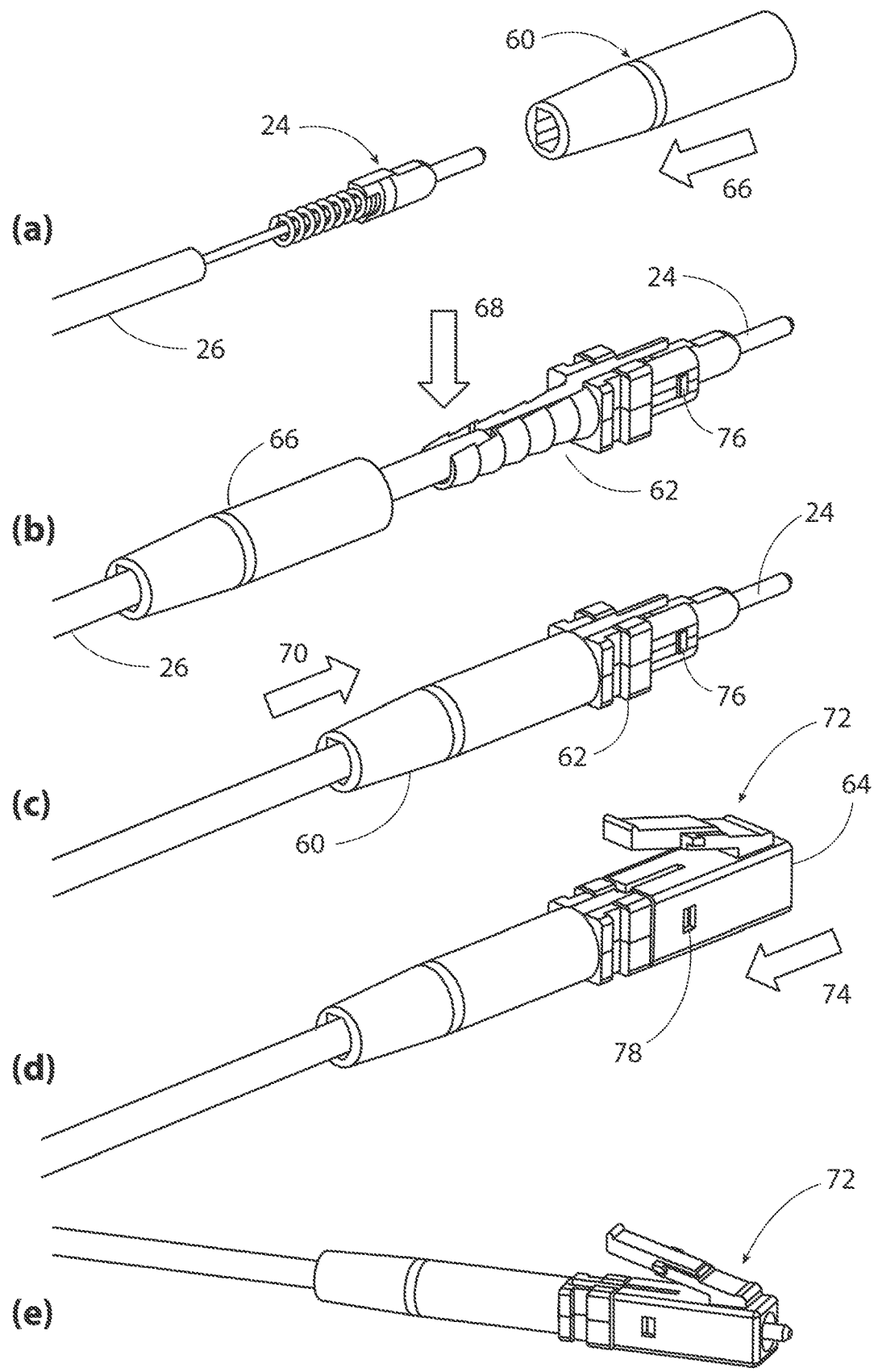
FIGS. 8 (a) to (e) are schematic representations of the stages of assembly of the terminal connector as applied to the end of the pre-terminated optical fibre construction according to an embodiment of the present invention after the leading end exits the duct.

The leading end 18 passes through the duct 20 and is fed from the reel 12 until the ferrule connector 24 and a length of the optical fibre cable assembly 10 exits the duct 20 within the telecommunications cabinet (see FIGS. 1 and 2). A protective cap may be fitted over the ferrule connector 24 while the installation takes place. In an embodiment where pulling is used instead of blowing, an adapter can be applied to provide a pulling eye and to protect the ferrule connector 24 from damage during pulling. One example of such an adapter is described below and is illustrated in FIG. 8.

Figure 3:
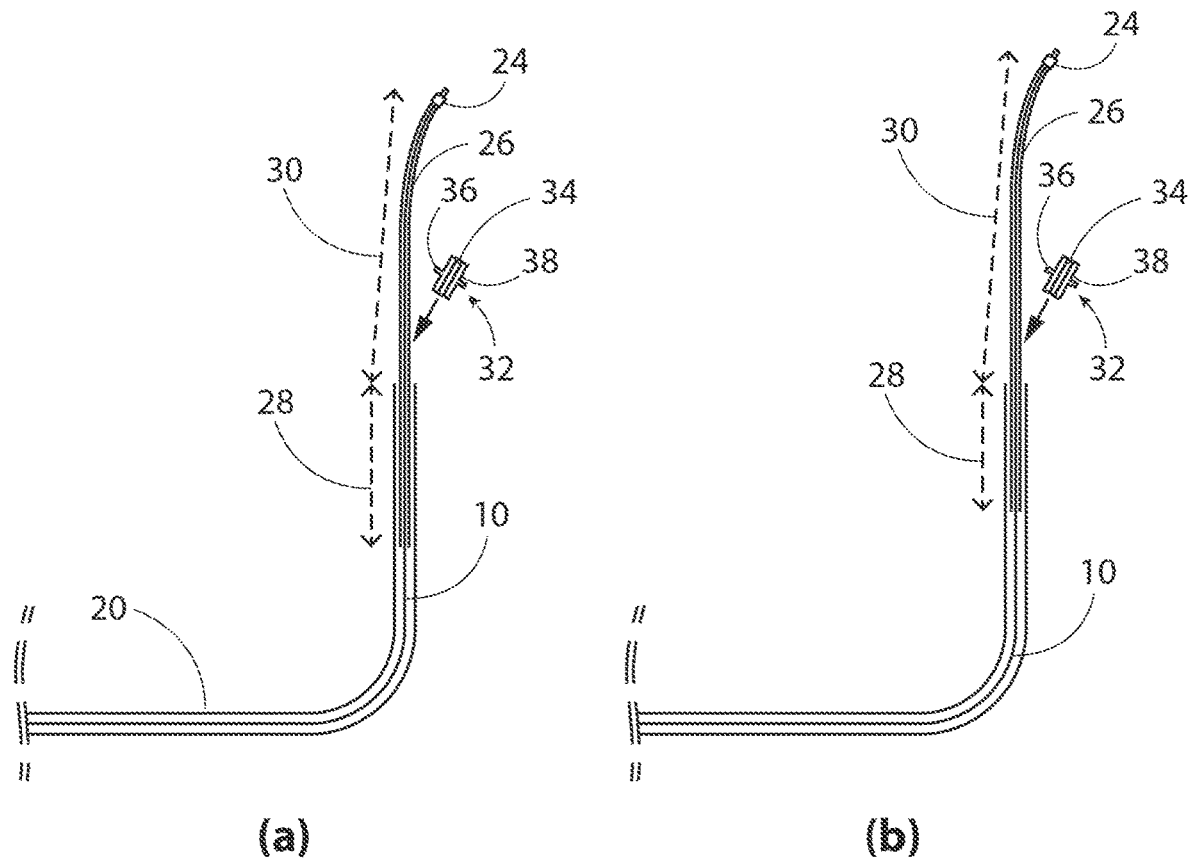
FIG. 3 is a schematic representation of when the leading end of a pre-terminated optical fibre cable assembly exits the duct according to an embodiment of the present invention, with different amounts of the cable assembly protruding from a duct at (a) and (b); There is 3a and 3b which need further explanation.
Figure 4:
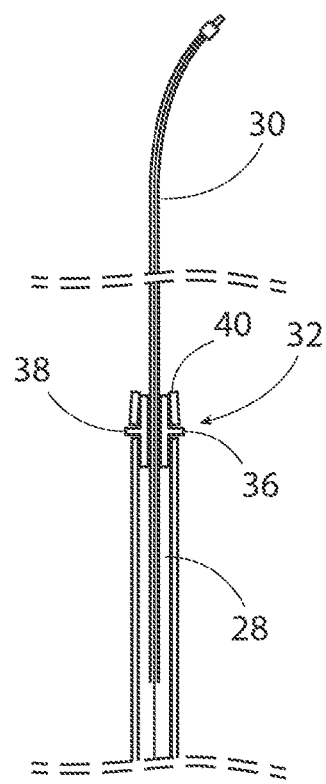
FIG. 4 is a schematic representation of a securing a pre-terminated optical fibre cable assembly according to an embodiment of the present invention to the duct after the leading end exits the duct; breakthrough; (where required, as it is not always required)

The action of the leading end 18 of the optical fibre cable assembly 10 exiting the far end of duct 20, following installation by blowing or pulling, is often referred to as breakthrough, as illustrated in FIGS. 3 and 4.

A fibre catcher (not illustrated) may be used to indicate when the leading end 18 of the optical fibre cable assembly 10 has reached its destination, that is, when the leading end 18 has exited the duct 20 and when a predetermined length of the optical fibre cable assembly 10 is within the cabinet 16. Alternatively, an installer may observe when the leading end 18 exits the duct 20, and communicate with the operator of the blowing machine 22 to cease blowing.

Referring now to FIG. 3, suppose that 1.5 metres is considered sufficient length of optical fibre to allow routing and connection within the telecommunications cabinet 16. Therefore, the length of optical fibre that exits the duct 20 may be in the region of 1.5 metres. Naturally, it is unusual that the length of optical fibre 10 protruding from the duct 20 will be exactly 1.5 metres, or exactly the length required for a particular connection point. The actual length may be slightly shorter or more likely slightly longer than the ideal, because of possible reaction-induced time delay in shutting off the blowing machine. For example, blowing may continue for slightly longer than when the fibre catcher indicates the fibres have exited the duct 20; even a short period of continued blowing may result in ripples along at least part of the length of the optical fibre cable assembly 10. When blowing stops, this ripple effect may result in a further length of optical fibre exiting the duct 20 (see FIG. 3b). It will be appreciated, especially in the case of a long blowing route, the excess length of optical fibre exiting the duct cannot be pulled back via the trailing end because this could lead to damage of the optical fibre within the duct 20. The ability to push excess back into the duct from the leading end may also be limited.

In the illustrated example (see FIGS. 2, 3 and 4) a protective sleeve 26 is provided along part of the length of the pre-terminated optical fibre cable assembly 10 such that a section of the protective sleeve 26 remains within the duct 20 after the leading end 18 exits the duct 20.

The protective sleeve 26 extends from a position behind the connector 24 along a minor length of the optical fibre cable assembly 10. The length of the protective sleeve 26 is such that a trailing part 28 of the protective sleeve 26 remains within the duct 20 after breakthrough, and a leading part 30 of the protective sleeve 26 covers the optical fibres where they protrude from the duct 20.

Referring to FIGS. 3 (a) and (b), this arrangement provides a substantial tolerance for variations in the length of the optical fibres that protrudes from the duct 20. No tailoring of a protective sleeve is required, after the leading end 18 exits the duct 20. The excess length of protective sleeve simply resides within the duct.

After the leading end 18 exits the duct 20, installation at the telecommunications cabinet 16 is completed by plugging the open end of the duct 20 with a suitable accessory.

In the illustrated example, the duct 20 is plugged with a hollow connector 32 that has an outer diameter 34 that is configured to be a push-fit into the duct 20 and has a hollow or groove into which the protective sleeve 26 containing the optical fibres is received. A flange 36 is provided as a stop/seal on the outside of the connector 32 should this be preferred by the operator. The flange 36 is operable to cap the exit of the duct 20.

In the illustrated example, with reference also to FIG. 4 an exposed extension member 38 of the hollow connector 32 extends beyond the flange 36 and envelops part of the protective sleeve 26. A capping sleeve 40 may be added to the exposed extension member 38. The capping sleeve 40 is operable to locally compress the protective sleeve 26 against the fibre cable assembly 10 to prevent fibre movement after installation of the optical fibre construction.

Figure 5:
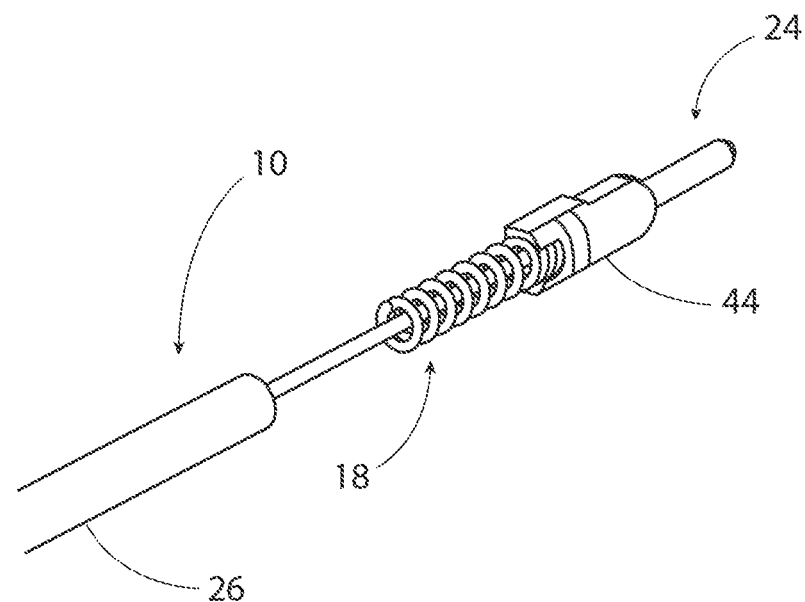
FIG. 5 is a schematic (This is more of a picture than a schematic) representation of a pre-terminated optical fibre cable assembly according to an embodiment of the present invention showing the pre-terminated leading end.

FIG. 5 illustrates in more detail one example of the connector 24 that may be used at the leading end of the pre-terminated optical fibre cable assembly 10. It will be understood that the ferrule connector 24 is of a size suitable for installation through the duct 20, and may not form a complete connector assembly until other components are added. In the illustrated example, the ferrule connector 24 includes a ferrule body 44 which facilitates attaching a connector body after the leading end 18 exits the duct 20, as described below with reference to FIG. 7. It will be understood that, while the cable may carry more than one optical fibre, for example 2 or 4 optical fibres, in the majority of installations, only one of these fibres carries live signals, and only that one is provided with a ferrule connector 24. The unused fibres are used, when necessary, as backup.

In one specific example comprising two ferrule connectors (not illustrated) connected to two individual optical fibres within the cable assembly, each ferrule body 44 is D-shaped in cross-section. The flat portions of the D-shaped bodies are abutted such that the combined dimension of the abutted bodies is small enough so both ferrule bodies can pass together through the duct. In practice, the combined dimension of the abutted ferrule bodies need not be any greater than the outer diameter of the protective sleeve 26.

The protective sleeve 26, as described above with reference to FIGS. 1 to 4, may extend along a minor part of the pre-terminated optical fibre cable assembly 10 and extends from behind the ferrule connector 24. The cable assembly 10 may be tens or even hundreds of metres in length, while the portion protected by the protective sleeve 26 may be a few metres or less. In this way, construction of the protective sleeve 26 can be optimised for protecting the optical fibres where they are vulnerable, outside the duct 20. Such a protective sleeve, applied to the whole length of the cable assembly, might otherwise degrade the installation performance, completely preventing installation by blowing, for example. Provision of such a protective sleeve along the whole length of the cable assembly may alternatively, or in addition, add unduly to the cost of the cable assembly, and or the weight and/or size. Particularly when many ducts are to be run in parallel, to serve different consumers within a street, building etc, any increase in the size of the cable assembly, and consequently the size of the individual duct required to carry it, can have a very significant effect on the size of the total space taken up by ducts, and the size of the cabinets needed for termination.

Figure 6:
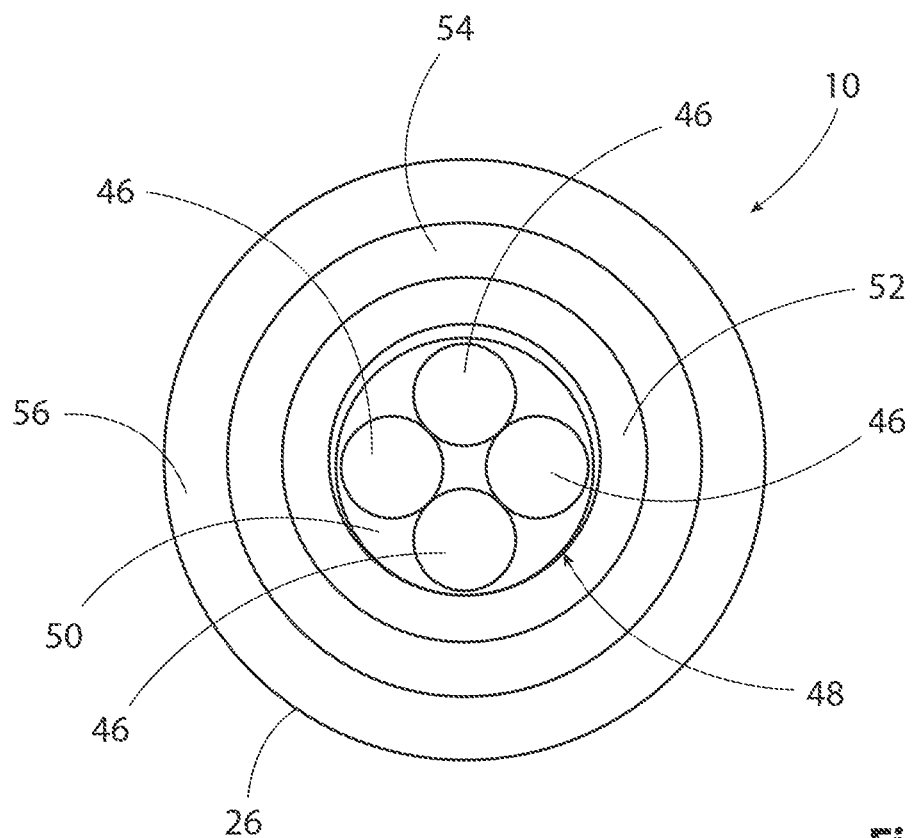
FIG. 6 is a schematic representation of a pre-terminated optical fibre construction according to an embodiment of the present invention showing the configuration of a protective sleeve applied to the pre-terminated optical fibre cable assembly.

FIG. 6 presents an example of the construction of the pre-terminated optical fibre cable assembly 10, as viewed in a portion comprising the protective sleeve 26. By way of illustration only, FIG. 6 shows, in cross-section, an optical fibre cable assembly 10, which includes four primary coated optical fibres 46. A fibre bundle 48, in this example, comprises the optical fibres 46 embedded in a UV-cured resin 50. Each optical fibre 46 may be, for example, 200 µm to 250 µm in diameter. The optical fibre bundle 48 has an outside diameter which may, for example, be less than 1 mm, typically in the region of 0.9 mm. The diameter of the bundle will of course increase and decrease to some extent, according to the number of fibres contained within it. Features within the bundle are not shown to scale. The thickness of resin over the optical fibres may be, for example 50 μm, at the minimum.

In the illustrated example, the protective sleeve 26 includes a layered construction which is applied by sliding directly over the fibre bundle 48. It will be appreciated that the positions and thicknesses of the layers in FIG. 6 are not to scale, but purely schematic. The internal diameter of the protective sleeve 26 may in practice be greater than the outer diameter of the fibre bundle 48, such that the protective sleeve 26 is easily applied and slides over the fibres freely. In an example, the inner diameter of the protective sleeve 26 is greater than 1 mm, for example in the region of 1.1 mm; thereby providing 0.1 mm or more clearance around the fibre bundle 48. In the illustrated example, the protective sleeve 26 has a construction, providing an outer diameter in the region of 2.1 mm and an inner bore in the region of 1.1 mm to freely receive the fibre bundle 48.

The construction of the protective sleeve 26, as illustrated in FIG. 6, has three layers. An inner layer 52 may be, for example, approximately 0.3 mm thick (300 microns) and provides flexibility to the protective sleeve 26. The inner layer 52, in this example, is made of a compound that is resilient, heat resistant and chemical resistant, for example Hytrel®. Hytrel® is a thermoplastic elastomer, specifically a copolyester material, which combines the flexibility of rubber with the strength and processability of thermoplastics, thus ensuring flexibility of the section of the fibre bundle 48 to which the protective sleeve 26 is applied.

The middle layer 54 of the protective sleeve 26 is a strengthening layer. In the illustrated example the middle layer 54 comprises aramid fibres, commonly known by the tradename Kevlar®.

The outer layer 56 of the protective sleeve 26 provides a low friction outer surface, as well as covering the layers below so that the favourable installation properties of the cable assembly 10 as a whole are not compromised. The low friction outer surface may be provided by a coating of a low-friction material or by blending a material having low friction properties with a sheath material. The sheath material may be, for example, high density polyethylene (HDPE), medium density polyethylene (MDPE), nylon or polypropylene. The use of a low friction material assists in the transportation of the pre-terminated optical fibre cable assembly 10 through the duct. Particularly in a cable assembly adapted for installation by blowing, frictional properties, as well as other properties of the cable assembly are very important. Even though the protective sleeve 26 may cover only a minor portion of the overall length, it is important that the protective sleeve 26 is designed not to degrade the installation properties unduly. This is, of course, a requirement that does not apply to conventional protective sleeves, of the type that might be added to protect the protruding end of the cable assembly, after it has been installed.

The protective sleeve 26 material may also have flame retardant properties, and/or example low smoke zero halogen (LSOH or LSZH). It is desirable that the protective sleeve 26 exhibits low fire hazard properties outside the duct 20 because it will be exposed once installed. Parts of the cable assembly 10 which are contained within the duct 20, may be protected against fire by the duct itself. For example, the protective sleeve 26 may comprise a polyethylene based material, comprising a friction reducing agent such that the outer layer exhibits low-friction properties. An example of a suitable material for the outer layer 56 may be a mixture of high density polyethylene (e.g. Borstar®) and a friction reducing agent. The friction reducing agent, which may also be called a "slip agent", might be, for example, a silicon-based material including a polyether modified poly (dimethylsiloxane) material such as a polyether modified hydroxy functional poly-(dimethylsiloxane) material. As an alternative to, or in addition to, the friction reducing materials described in the above embodiments, erucamide and/or oleamide materials may be used as slip agents.

It will be appreciated that, as an alternative to the layered construction described above, the protective sleeve 26 may be constructed from a single layer, or multiple layers of composite material, which provides the structural, chemical and low-friction properties required to protect the underlying fibre bundle 48 and the optical fibres 46 during installation and after installation.

In one embodiment, the fibre bundle 48 may be covered by an outer sheath (not illustrated in FIGS. 1-6), which extends substantially the full length of the optical fibre bundle 48. This embodiment may for example be based on a cable assembly of the type disclosed in WO2004015475, mentioned above, in which the outer sheath is extruded onto the optical fibre bundle during manufacture. The outer sheath may be made for example of HDPE, with or without a friction-reducing additive. The outer sheath protects the bundle and facilitates sliding of the bundle through the duct 20, much more easily than if the acrylate material of the coating of the bundle 48 were in direct contact with the interior of the duct. The outer sheath is stripped from the ends of the cable assembly, to gain access to the bundle and the optical fibres, for termination, splicing etc. It is a matter of choice, whether this outer sheath remains in place underneath the protective sleeve 26, or is omitted, in those parts of the cable assembly where the protective sleeve 26 covers the optical fibre bundle 48. These different options are illustrated in more detail, in FIG. 7.

Figure 7:
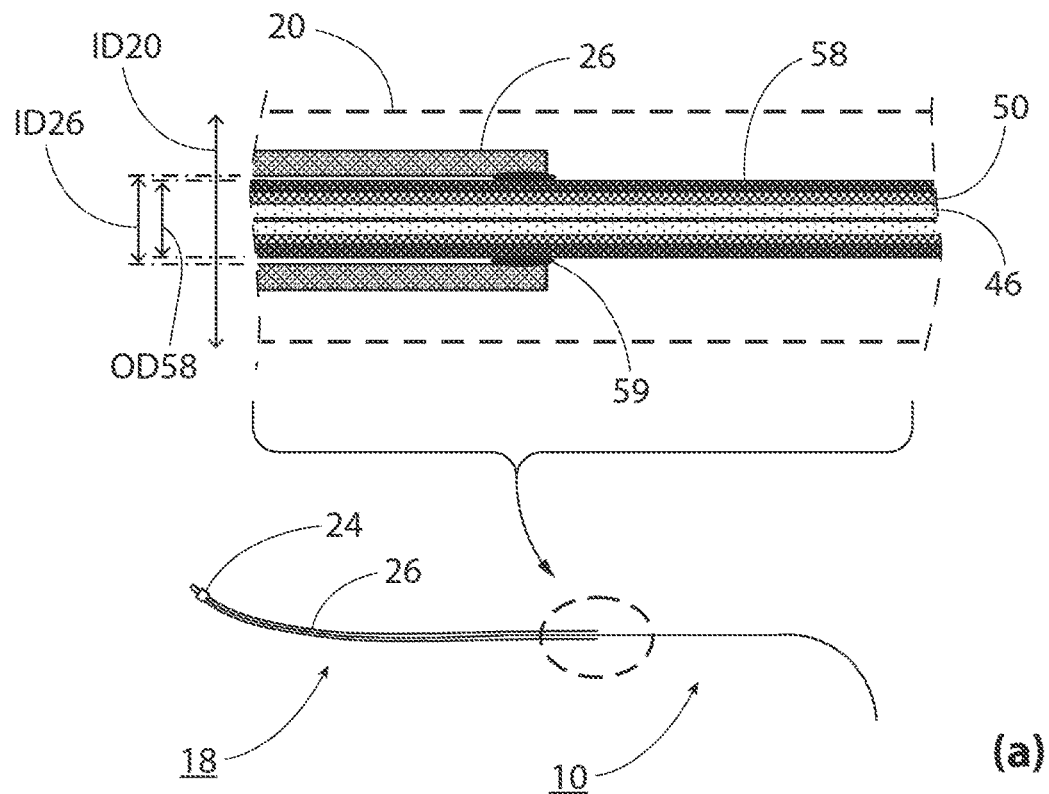
FIG. 7 shows in more detail part of a pre-terminated optical fibre cable assembly, in three embodiments (a), (b) and (c)
Figure 7:
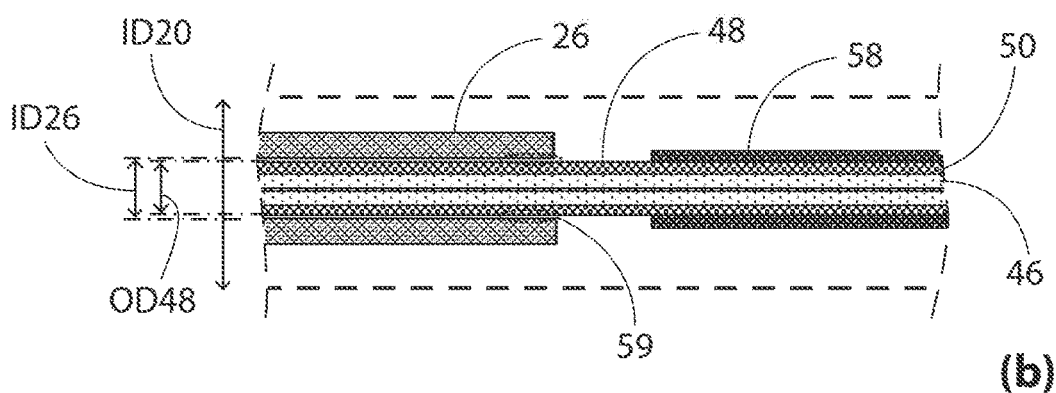
Figure 7:
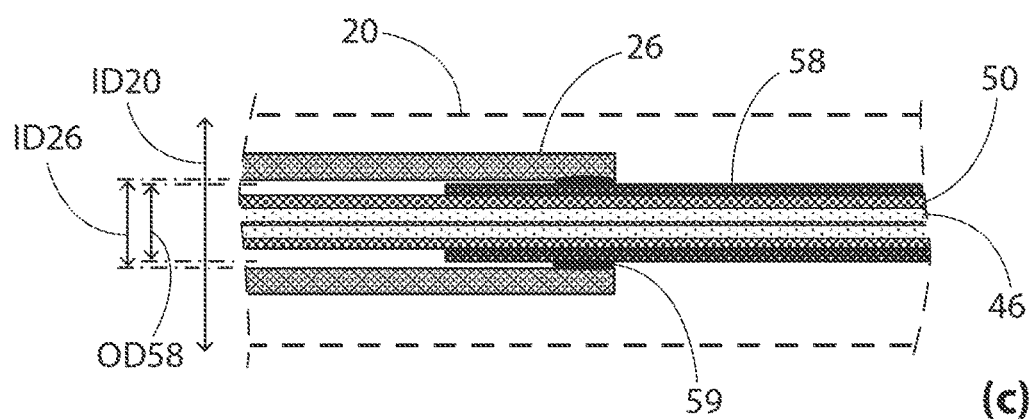

Referring generally to FIG. 7, a pre-terminated optical fibre cable assembly 10, can be assembled by sliding the protective sleeve 26 over an end section of a longer, pre-manufactured optical fibre cable assembly. FIG. 7(*a*) illustrates an example where the pre-manufactured optical fibre cable assembly has an outer sheath 58 which remains in place under the protective sleeve 26. It will be appreciated that the inner diameter ID26 of the protective sleeve 26 and the outer diameter OD58 of the outer sheath are dimensioned such that the protective sleeve 26 slides freely over the outer sheath.

In another embodiment, illustrated in the detail of FIG. 7(*b*), a section of the outer sheath 58 is removed and the protective sleeve 26 is added to the resulting exposed section of the fibre bundle 48. In this example, the inner diameter ID26 of the protective sleeve 26 maybe smaller than the outer diameter OD58 of the outer sheath, being dimensioned such that the protective sleeve 26 slides freely over the coated fibre bundle 48 only.

In a further alternative embodiment, illustrated in FIG. 7(*c*) the protective sleeve 26 overlaps a short section of the outer sheath 58. For example, the protective sleeve 26 may extend a metre or two behind the leading end 18 of the optical fibre cable assembly 10, while the outer sheath 58 extends to a point that overlaps with the protective sleeve 26 by a centimetre or a few centimetres. The protective sleeve 26 may have dimensions the same as in FIG. 8(*a*), in this case, or maybe slightly smaller, and stretch to fit over the end of the remaining outer sheath 58.

Figure 11:
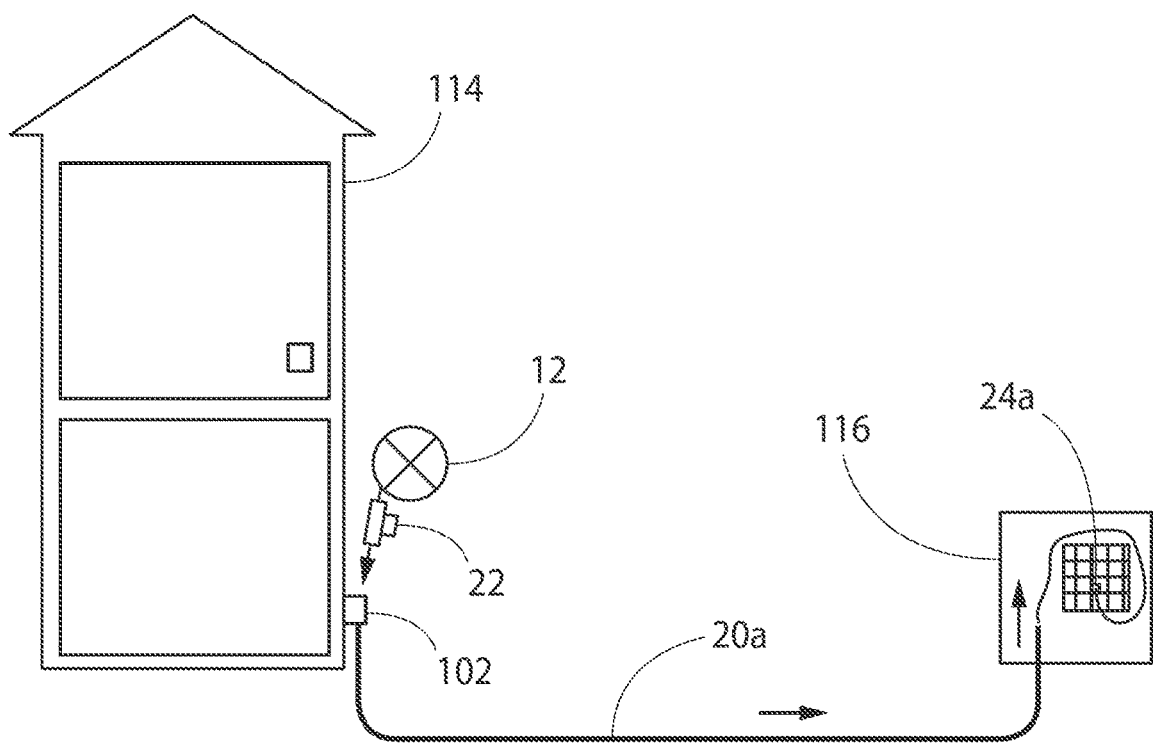
FIG. 11 shows in two steps (a) and (b) the installation of the cable assembly of FIG. 9.
Figure 11:
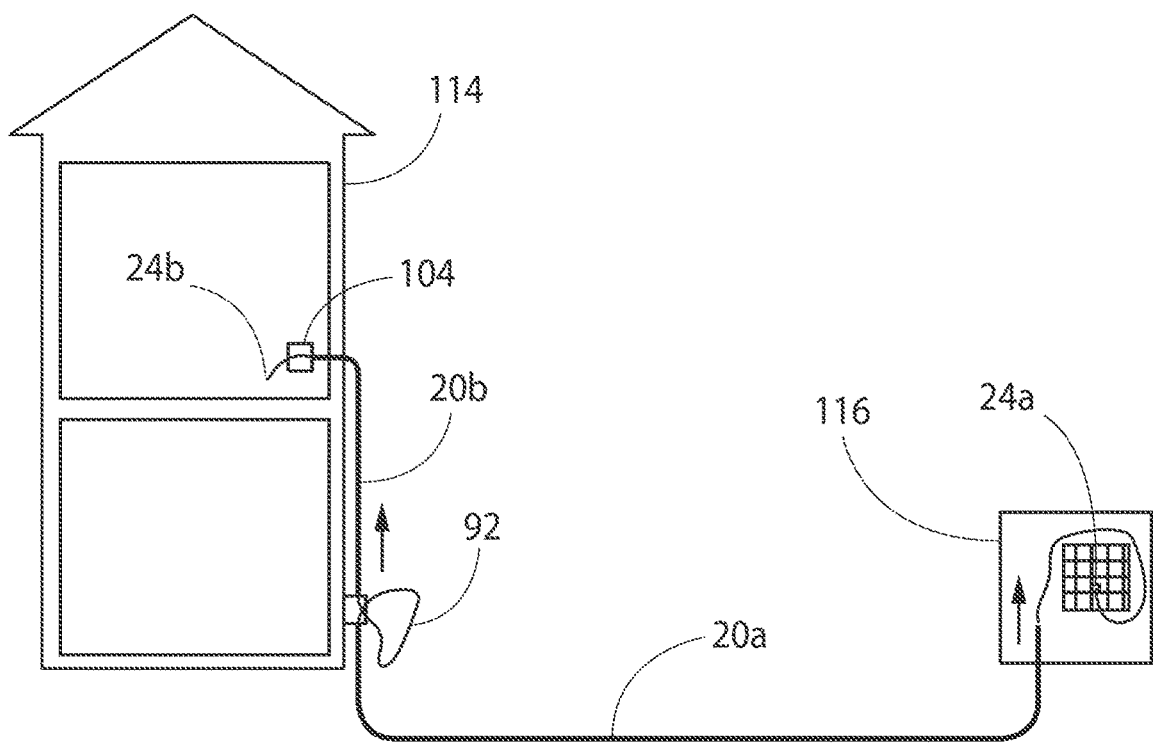

In the manufacture of the optical fibre cable assembly 10, the protective sleeve 26 in some embodiments is bonded to the underlying layer at some point. In other embodiments, bonding may be unnecessary. As illustrated in FIG. 11(*a*), this bonding can be applied at the trailing end of the protective sleeve 26, such that movement of the protective sleeve 26, relative to the optical fibres 46, is prevented during installation or the protective sleeve 26. If bonded, suitable bonding locations may be those indicated schematically with reference 59. While this example illustrates bonded locations 59 at the trailing end of the protective sleeve 26, bonding locations may alternatively or additionally be provided at the leading end 18 of the protective sleeve 26, or along the length of the protective sleeve 26, or at intermittent points along the length of the protective sleeve 26. The protective sleeve 26 may be bonded, for example with suitable adhesive (e.g. a common cyanoacrylate adhesive, also known as Superglue™), such that the protective sleeve 26 remains stationary relative to the fibres 46, the fibre bundle 48 or outer sheath 58 during installation of the pre-terminated optical fibre cable assembly 10. Depending on the embodiment, the underlying layer to which the protective sleeve 26 is bonded may be an outer sheath 58, or a coating 50 of the fibre bundle 48. In principle, the portion of the cable assembly 10 over which the protective sleeve 26 extends might contain only the primary coated optical fibres 46.

In the example of FIG. 7(*b*), potential bonding locations 59 are indicated, but in one particular embodiment, bonding is unnecessary. Recalling that protective sleeve 26 may have an inner diameter less than the outer diameter of outer sheath 58, the end of outer sheath 58 forms a natural stop, beyond which the protective sleeve cannot slide. Similarly, at the leading end of the cable assembly 10, ferrule connector 24 provides a stop, beyond which the protective sleeve 26 cannot slide. As described further below, it is expected that leading end of protective sleeve 26 will be clamped to the underlying fibre bundle. An advantage of not bonding the protective sleeve 26 to the fibre bundle 48 is that the protective sleeve 26 will be free to expand or contract due to heat and cold, without transmitting any forces to the fibre bundle 48.

As an alternative to adhesive, heat-shrinking or other fixing methods can be considered, provided they do not damage the underlying structure, of course, or result in a bulky profile. As mentioned already, in a variation of the example of FIG. 7(*c*), the inner diameter of the protective sleeve 26 may be made smaller than the outer diameter of outer sheath 58, so that the end of the protective sleeve 26 has to stretch over the end of the outer sheath 58, becoming fixed against longitudinal movement by friction.

An inner bore of the intended duct 20 is illustrated in broken lines, with inner diameter ID20. It will be appreciated that the embodiment of FIG. 7(*a*) is likely to have a larger outer diameter of the protective sleeve 26, and therefore require a larger duct for installation. As mentioned already, space is normally precious, and it may be an advantage of the embodiment of FIG. 7(*b*) that the protective sleeve 26 can have a smaller outer diameter, and therefore travel within a smaller duct. Embodiments of this latter type can be designed to travel through the conventional microduct, for example having an internal bore of only 3.5 mm.

Another step in the assembly of the pre-terminated optical fibre cable assembly 10 is adding a connector 24, for example a ferrule connector, to the leading end 18 of one or more of the optical fibres 46 within cable assembly 10. If this step is performed after sliding on protective sleeve 26, the ferrule connector 24 need not pass through the protective sleeve 26, and a more compact construction is enabled. The ferrule connector 24 can be added before or after the protective sleeve 26 is bonded to the optical fibre bundle, terminating at a location closely behind the ferrule connector 24. The precise location can be determined by reference to the subsequent steps for adding a connector body to the ferrule connector 24. The steps will be illustrated below, with reference to FIG. 8. To allow precise positioning, it is proposed to bond the trailing end of the sleeve only after fitting the ferrule connector 24.

The optical fibre cable assembly 10 is then ready for installing by blowing, pushing or pulling as described above with reference to FIGS. 1 to 4.

Referring to FIG. 8, after the leading end 18 of the optical fibre cable assembly 10 emerges from the duct 20, a connector body is fitted over the ferrule connector 24. In the illustrated example, the connector body includes a boot 60, a rear housing 62 and a front housing 64. As illustrated in FIG. 8, steps (a) to (e) the boot 60, the rear housing 62 and the front housing 64 are fitted over the ferrule connector 24 in a particular sequence, to complete construction of the optical fibre cable assembly 10 prior to connecting within the telecommunications cabinet 16.

Referring to FIG. 8(*a*), the boot 60 is slid over the ferrule 24 and part of the protective sleeve 26 in the direction of arrow 66. Next, in FIG. 8(*b*), the rear housing 62 is applied by inserting the ferrule 24 and a section of the protective sleeve 26 into a recess in the rear housing 62 in the direction of arrow 68.

Referring to FIG. 8(*c*), assembly of the rear housing 62 is completed by pushing the boot 60 in the direction of arrow 70, over the rear section of the rear housing 62. By this action, the rear housing 62 of the connector clamps the protective sleeve 26 and the rear section of the ferrule 24 against the underlying layers of the optical fibre cable assembly 10 and grips them securely within the rear housing 62.

Referring to FIG. 8(*d*), assembly of the connector body 72 is completed by applying the front housing 64 to the front end of the rear housing 62, in the direction of arrow 74. The rear housing 62 comprises resilient locking pegs 76 (see (b) and (c)). The locking pegs 76 locate in holes 78 provided on the walls of the front housing 64 such that when the locking pegs 76 engage with the holes 78 the front housing 64 is locked in place. The finished connector body 72 is shown in FIG. 8(*e*) end of the optical fibre is thus ready for connecting to a receiving port 80 inside the telecommunications cabinet 16 (FIG. 1). The skilled reader will recognise that connector 72 in this example is of a standard "LC" type. Other types of connector can be provided. It is a matter of detailed implementation, whether the rear housing 62 is identical to known designs, or is modified specifically to accommodate the leading end of protective sleeve 26.

If desired, the process illustrated in FIG. 8 can be repeated at the opposite end of the optical fibre, to create a double pre-terminated cable assembly (described below with reference to FIGS. 10 and 11). In current practice, an SC connector is commonly used to terminate the optical fibre at the consumer premises. In embodiments of the present disclosure, the more compact LC type connector is used at both ends. The ferrule connector 24 of the LC connector can be smaller, and compatible with the micro-ducts used for blowing. Referring again to the specific example where each ferrule body 44 is D-shaped in cross-section, this D-shaped profile can be seen in the rear opening of boot 60, in the example of FIG. 8. Ferrule bodies having the D-shaped profile can of course be used in installations where only a single fibre is terminated, as shown here, as well as installations where a pair of fibres are terminated and the ferrule bodies lie side-by-side during installation in a duct.

Installing a protective sleeve 26 prior to installing the pre-terminated optical fibre cable assembly 10 through a duct 20, advantageously removes the post-installation step of installing a protective outer jacket, for example a braided or woven sleeve, to the optical fibre cable assembly 10 in the field, for example at a telecommunication cabinet. It will be appreciated that installing braiding can be time consuming and it can fray if adjustment is required. This can expose the fibre bundle 48 and could lead to damage of the optical fibres 46. If the braiding becomes disconnected or broken, the connector body may become disconnected. In addition, the interior of the cabinets can look untidy and unfinished. Dozens or even hundreds of connections may be made in the same cabinet, meaning that the fibre and sleeve can be subjected to repeated disturbance over their lifetime.

As mentioned, the cable assembly of the type disclosed herein can be installed by blowing, or by pushing, pulling, or by a combination of these processes. For pulling, it may be noted that ducts can be purchased which are pre-loaded with a pulling line.

Figure 9:
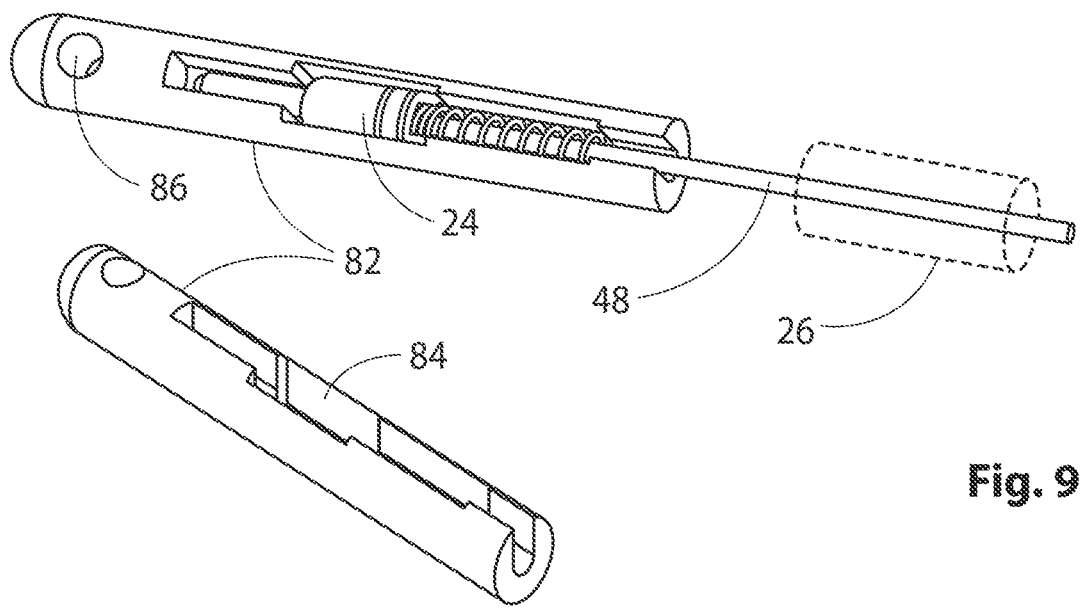
FIG. 9 shows an accessory for use in pulling installation of a pre-terminated cable assembly.

FIG. 9 illustrates a pulling accessory 82 that can be used with a pulling line, to install an optical fibre and/or optical fibre cable that has been pre-terminated with a ferrule connector 24. The coated fibre bundle 48 is shown, which is also fitted with a protective sleeve 26 (shown in dotted lines). Two of the accessories are illustrated, one fitted to the end of the optical fibre, and one spare. As can be seen, the pulling accessory 82 has a recess 84 tailored to fit over the pre-terminated end of the optical fibres, capturing the ferrule body 24. At a rounded front end of the pulling accessory 82, a pulling eye 86 is provided, for attaching the pulling line (not shown).

As is known by the skilled person, the distance that a length of optical fibre cable that can be installed by pulling or pushing may be significantly less than the distance that can be obtained by blowing, but it may be adequate, for example for short drops within a building, or from street to building.

Figure 10:
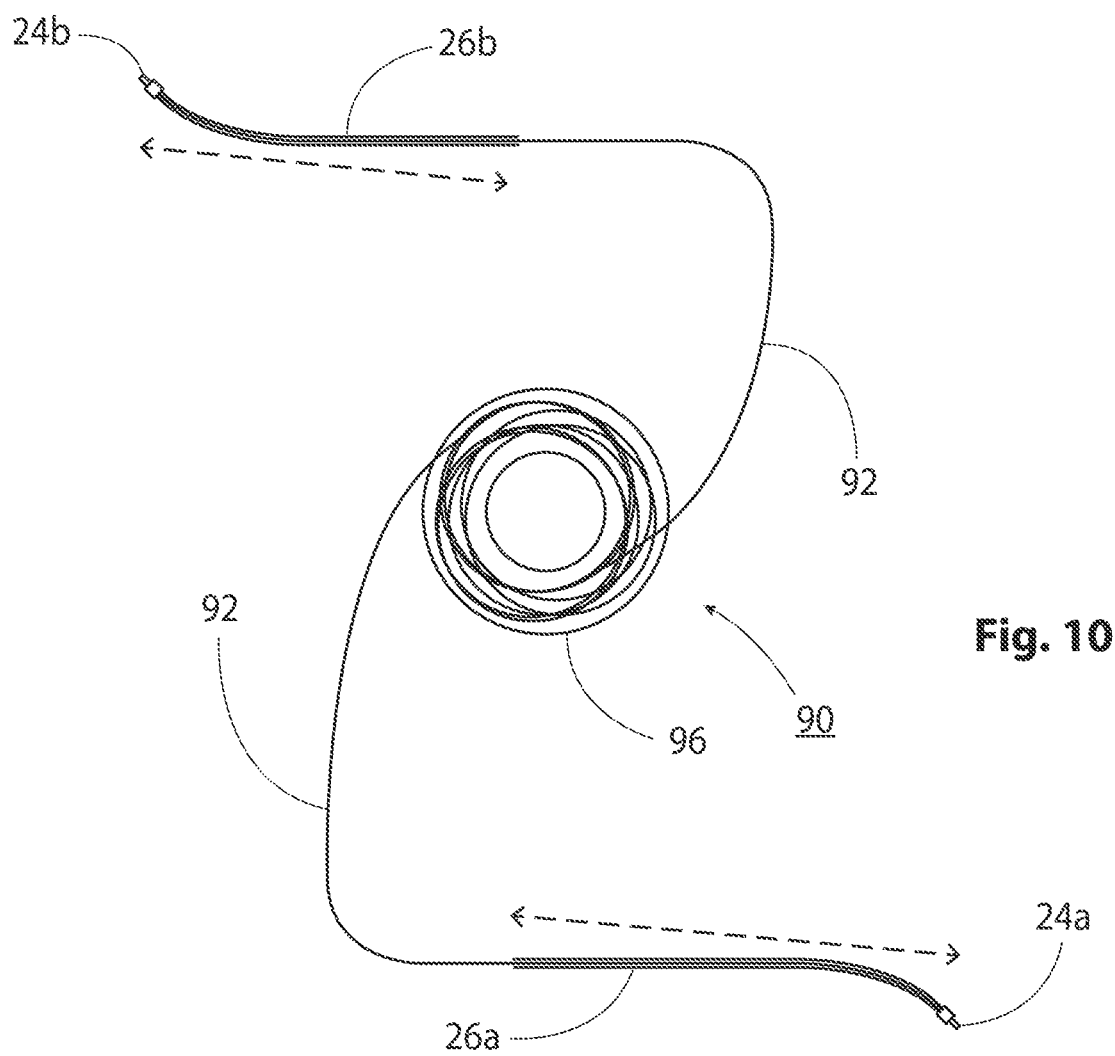
FIG. 10 illustrates schematically an optical fibre cable assembly pre-terminated and provided with protective sleeves at both ends.

FIG. 10 illustrates another example of a pre-terminated optical fibre cable assembly 90 constructed in accordance with the principles of the present disclosure. This example, is a length of optical fibre cable 92, which is pre-terminated at both ends with ferrule connectors 24a and 24b, and both ends are provided with protective sleeves 26a and 26b. The cable 92, as delivered, is coiled in a pan 96 or wound on a reel, in the conventional manner. The types of connectors at the different ends can be the same or different. The lengths of protective sleeve 26 can be the same at both ends, or different, as shown. For particular applications, the structure of the protective sleeve 26a may even be different to that of protective sleeve 26b. In particular, it is envisaged that one of the ends of the cable assembly 90 might be installed by blowing, over a large distance, say, while the other end is installed over a shorter distance, for example by blowing, pushing or pulling. One of the ends may terminate at a communications cabinet, while the other end terminates within a consumer premises, such as a house or office.

FIG. 11 illustrates an example of such an installation, using the double-ended pre-terminated cable assembly 90. A first installation step is illustrated in FIG. 11(*a*) and a second installation step is illustrated in FIG. 11(*b*). The first installation step corresponds, for example, exactly to the blowing installation process described above with reference to FIGS. 1 and 2. From an access point 102 on the exterior of a building 114, a first end of the cable assembly 90 is installed by blowing to a cabinet 116. The installation distance may be hundreds of metres or more. At the end of this first installation step, the second end of the cable assembly, and a coil of excess cable, remain at the access point.

In the second installation step illustrated in FIG. 11(*b*), the second end of the cable assembly 90 is installed into a local drop duct, to reach a particular apartment or room within the building 114. As illustrated, this may be a consumer's connection point 104 on an upper floor of the building. This installation step, which may comprise only a few metres of cable, may be performed by manual pushing, pulling or blowing if necessary. Within the consumer premises, the connector body can be added to the ferrule connector, while the pre-fitted protective sleeve protects the protruding length of the cable. Excess cable can be stored at a suitable point on the installation, for example in the home/office at connection point 104, or in a termination housing 102 at the side of the building (as shown in FIG. 11), or at some point in between. When the cable assembly 10 or 90 is lightweight and compact to begin with, storing the excess length is not such a problem as it is in the case of the bulky drop cable described in the disclosure of WO2014/015902A1A, mentioned in the introduction.

Using pre-fitted protective sleeves, in the manner described, improves the installation process, by reducing post installation steps and time. As such, production costs and assembly costs may be reduced compared with subsequently applying a protective sleeve, in particular a braided or woven sleeve. The existing solution, a protective sleeve added after installation, is typically of larger diameter, than the pre-installed protective sleeve 26 described above. This can be because of the nature of the manufacturing process to produce a braided protective sleeve braid, which comprises multiple overlapping yarns. This could also be because the braid needs to be large enough to pass over the ferrule connector 24. Therefore, preinstalling a protective sleeve 26 as described above saves space and therefore facilitates more installations within one cabinet.

Additionally, following the principles of the present disclosure, the delicate steps of fibre termination and assembly of the entire pre-terminated cable assembly with protective sleeves can be performed in a controlled factory environment, rather than in the field. As explained already above, and as illustrated in FIG. 3, the length of the pre-fitted protective sleeve 26 does not need to be precisely tailored to a particular installation. Needs only to be sufficient that to protects whatever length of optical fibre will be protruding from the duct. As described, these measures can be applied to only one end of the cable assembly, or to both ends. These measures can be applied especially to a compact and lightweight cable, of the type designed for installation by blowing, although the method of installation is by no means limited to blowing. The present disclosure encompasses kits of parts for use in producing pre-terminated optical fibre cable assemblies of the type described, as well as the method of manufacturing such assemblies, and the stocking and distribution of such assemblies for installation, together with accessories involved in the installation. The present disclosure encompasses methods of installation, as described, including the cable assemblies.

Whilst specific embodiments of the present invention have been described above, it will be appreciated that departures from the described embodiments may still fall within the scope of the present invention.

The invention claimed is:

1. A pre-teminated optical fibre cable assembly configured to be installed through a duct, wherein prior to installation the pre-terminated optical fibre cable assembly comprises:
   at least one optical fibre;

a terminal connector on at least a leading end of the at least one optical fibre; and a protective sleeve extending from a position closely behind the terminal connector along a minor part, less than 50% of a length of the at least one optical fibre for protecting the at least one optical fibre where the at least one optical fibre is vulnerable outside the duct, and where the at least one optical fibre emerges from the duct after installation through the duct, wherein the cable assembly, including the leading end having the terminal connector and the protective sleeve, is adapted for installation into said duct by blowing; wherein the protective sleeve includes an outer layer having law-friction properties, wherein the outer layer includes a polyethylene based material and a friction-reducing agent selected from the group consisting of a silicon-based material, erucamide material and/or oleamide material, and wherein the low-friction properties assist transportation of the pre-terminated optical fibre cable assembly through the duct.

2. The pre-terminated optical fibre cable assembly as claimed in claim 1, further comprising a protective layer is provided over the at least one optical fibre and wherein the protective layer extends over a major part of the length of the optical fibre.

3. The pre-terminated optical fibre cable assembly as claimed in claim 2, wherein the protective layer extends over substantially the full length of the at least one optical fibre.

4. The pre-terminated optical fibre cable assembly as claimed in claim 2 wherein the protective layer comprises a first layer in which the at least one optical fibre is embedded with one or more other optical fibres in said first layer to form an optical fibre bundle, the protective sleeve extending over said optical fibre bundle.

5. The pre-terminated optical fibre cable assembly as claimed in claim 4, wherein the first layer comprises a UV-cured resin.

6. The pre-terminated optical fibre cable assembly as claimed in 4, wherein the optical fibre bundle is surrounded by an outer sheath of extruded material over at least a majority of the length of the optical fibre bundle.

7. The pre-terminated optical fibre cable assembly as claimed in claim 6, wherein the outer sheath extends beneath said protective sleeve along substantially a whole length of the protective sleeve.

8. The pre-terminated optical fibre cable assembly as claimed in claim 7, wherein said outer sheath extends beneath said protective sleeve along only a part of a length of the protective sleeve.

9. The pre-terminated. optical fibre construction as claimed in claim 6, wherein the outer sheath has been removed a the portion of the optical fibre that lies beneath the protective sleeve, and extends from a point behind the protective sleeve.

10. A pre-terminated optical fibre cable assembly as claimed in claim 9, wherein the outer sheath abuts the protective sleeve, thereby providing a restraint against movement of the protective sleeve.

11. The pre-terminated optical fibre cable assembly as claimed in claim 1, wherein the outer layer of the protective sleeve is formed by a mixture of a polymer and a friction reducing material.

12. The pre-terminated optical fibre cable assembly as claimed in claim 11, wherein the polymer of the outer layer of the protective sleeve is primarily HDPE.

13. The pre-terminated optical fibre cable assembly as claimed in claim 11, wherein the polymer of the outer surface of the protective sleeve is Polypropylene.

14. The pre-terminated cable assembly as claimed in claim 1, wherein the protective sleeve has an outer diameter between 0.5 and 3.5 mm.

15. The pre-terminated cable assembly as claimed in claim 14, wherein the protective sleeve has an outer diameter less than 2.5 mm.

16. The pre-terminated cable assembly as claimed in claim 1, wherein a portion of the cable assembly, including the leading end having the terminal connector and the protective sleeve, is adapted for installation into the duct having an inner bore diameter of approximately 3.5 mm.

17. The pre-terminated cable assembly as claimed claim 1, further comprising a duplex terminal connector, wherein two terminal connectors are connected to two optical fibres, each terminal connector comprising a ferrule body., the ferrule body being adapted to be received in a connector body after installation, and wherein a portion of the cable assembly, including the leading end having the terminal connector and the protective sleeve, is adapted for installation into the duct having an inner bore diameter of approximately 8 mm.

18. The pre-terminated optical fibre cable assembly as claimed claim 1, wherein the protective sleeve is fixed against longitudinal movement relative to the at least one optical fibre, by fixing at least a first end of the protective sleeve to an underlying layer.

19. The pre-terminated optical fibre cable assembly as claimed in claim 18, wherein the protective sleeve is fixed against longitudinal movement relative to the at least one optical fibre, by fixing both ends or by fixing the protective sleeve to the optical fibre along a full length of the protective sleeve.

20. The pre-terminated optical fibre cable assembly as claimed claim 1, wherein the protective sleeve is free moving over a section of an underlying optical fibre before it is installed.

21. The pre-terminated optical fibre cable assembly as claimed in claim 1, wherein the protective sleeve extends along the at least one optical fibre for less than 10% of the length of the at least one optical fibre.

22. The pre-terminated optical fibre cable assembly as claimed claim 1, wherein the protective sleeve comprises a plurality of layers.

23. The pre-terminated optical fibre cable assembly as claimed in claim 22, wherein the outer layer of the protective sleeve comprises at least a low-friction outer surface, the protective sleeve further comprising a middle layer comprising a strengthening material, and an inner layer comprising a resilient material.

24. The pre-terminated optical fibre cable assembly as claimed in claim 23, wherein the middle layer the protective sleeve comprises fibres such as aramid fibres.

25. The pre-terminated optical fibre cable assembly as claimed in claim 23, wherein the inner layer of the protective sleeve comprises a material that is resilient, heat resistant and chemical resistant.

26. The pre-terminated optical fibre cable assembly as claimed in claim 25, wherein the inner layer of the protective sleeve comprises a thermoplastic elastomer.

27. The pre-terminated optical fibre cable assembly as claimed in claim 26, wherein said thermoplastic elastomer is a copolyester.

28. The pre-terminated optical fibre cable assembly as claimed in claim 23, wherein the outer layer of the protective sleeve comprises Polypropylene and a friction reducing material.

29. The pre-terminated optical fibre cable assembly as claimed in claim 1, wherein the friction reducing agent is a polyether modified polydimethylsiloxane.

30. The method as claimed in claim 29, nigher comprising: clamping the protective sleeve within or adjacent the connector body to prevent movement of the protective sleeve relative to the connector body.

31. The pre-terminated optical fibre cable assembly as claimed in claim 29, wherein the friction reducing agent is a polyether-modified. hydroxy functional polydimethylsiloxane material.

32. The pre-terminated optical fibre assembly as claimed in claim 1, wherein the friction reducing agent is erucamide and/or oleamide materials.

33. A method of assembling a pre-terminated optical fibre cable assembly prior to installation through a duct, the method comprising the steps of:
taking at least one optical fibre;
fitting a protective sleeve onto a leading end of the at least one optical fibre, wherein the protective sleeve includes an outer layer having low friction properties, wherein the outer layer including a polyethylene based material and a friction reducing agent selected from the group consisting of a silicon-based material, erucamide material and/or oleamide material, wherein the low-friction properties assist transportation of the assembled pre-terminated optical fibre assembly through the duct;
extending the protective sleeve along a minor part of the length of the at least one optical fibre;
attaching a terminal connector to the leading end of the at least one optical fibre; and
arranging the protective sleeve to extend from behind the connector along the minor part of the length of the at least one optical fibre, wherein the protective sleeve extends towards a trailing end of the at least one optical fibre.

34. The method as claimed in claim 33, further comprising the step of: fixing at least a part of the protective sleeve against longitudinal movement relative to the at least one optical fibre.

35. The method. as claimed in claim 33, wherein said at least one optical fibre is received embedded with one or more other optical fibres within a first layer of cured resin to form an optical fibre bundle, said protective sleeve extending over said optical fibre bundle.

36. The method as claimed in claim 35, wherein said at least one optical fibre is received with said optical fibre bundle enclosed within an extruded outer sheath, and wherein the step of applying the protective sleeve includes removing of said outer sheath of the received cable assembly from at least part of the optical fibre bundle, before applying the protective sleeve over the at least part of the optical fibre bundle.

37. A method of installing a pre-terminated optical fibre cable assembly into a duct, wherein the optical fibre cable assembly includes at least one optical fibre, a terminal connector on at least a leading end of the at least one optical fibre; and a protective sleeve extending from a position closely behind the terminal connector along a minor part, less than 50% of the length of the at least one optical fibre, for protecting the at least one optical fibre where the at least one optical fibre is vulnerable outside the duct, wherein the method of installing the pre-terminated optical fibre cable assembly into the duct comprises the steps:
inserting the leading end of said pre-terminated optical fibre assembly into a duct, wherein the leading end includes the terminal connector and the protective sleeve;
transporting the leading end of said pre-terminated optical fibre cable assembly including a length of the protective sleeve through the duct; wherein the step of transporting the length of the pre-terminated optical fibre cable assembly through the duct continues until a leading portion of the pre-terminated optical fibre assembly emerges and protrudes from the duct, protected by the protective sleeve; and wherein a section of the protective sleeve remains within the duct after the step of transporting the length of the pre-terminated optical fibre cable assembly including a length of protective sleeve through the duct.

38. The method as claimed in claim 37, further comprising: sealing a duct exit.

39. The method as claimed in claim 38, wherein sealing the duct exit comprises fitting a seal around a protruding section of the protective sleeve and fitting the seal to the duct exit.

40. The method as claimed in claim 39, wherein the seal includes a plug and a cap, wherein the method includes inserting the plug into the duct and closing the duct exit with the cap.

41. The method as claimed in claim 38, further comprising: installing an optical fibre clamp proximate the duct exit.

42. The method as claimed in claim 38, further comprising: clamping the protective sleeve proximate the duct exit, wherein clamping the protective sleeve is effective to prevent movement of the at least one optical fibre relative to the duct.

43. The method as claimed claim 37, further comprising connecting one end of the pre-terminated cable assembly to supply equipment and another end of the pre-terminated construction to consumer equipment.

44. The method as claimed in claim 43, wherein said terminal connector comprises a ferrule connector and, wherein the method further comprises adding a connector body to the ferrule connector of the pre-terminated optical fibre cable assembly after installation in the duct, wherein the connector body facilitates the connecting step.

* * * * *